United States Patent [19]
Ooishi et al.

[11] Patent Number: 5,628,010
[45] Date of Patent: May 6, 1997

[54] METHOD AND DEVICE FOR ACCESSING CHARACTER FILES IMAGE DATA

[75] Inventors: Isamu Ooishi; Fumihisa Kobayashi, both of Kawasaki, Japan

[73] Assignee: Fujitsu Limited, Kawasaki, Japan

[21] Appl. No.: 682,384

[22] Filed: Jul. 17, 1996

Related U.S. Application Data

[63] Continuation of Ser. No. 108,106, Aug. 17, 1993, abandoned.

[30] Foreign Application Priority Data

Feb. 19, 1993 [JP] Japan .................... 5-030972

[51] Int. Cl.⁶ .................................. G06F 17/30
[52] U.S. Cl. .................... 395/601; 364/DIG. 1; 364/282.1
[58] Field of Search ............... 395/600; 364/419

[56] References Cited

U.S. PATENT DOCUMENTS

| | | | |
|---|---|---|---|
| 3,704,453 | 11/1972 | Blackwell et al. | 395/275 |
| 4,992,954 | 2/1991 | Takeda et al. | 395/151 |
| 5,148,541 | 9/1992 | Lee et al. | 395/600 |
| 5,175,803 | 12/1992 | Yeh | 395/100 |
| 5,231,577 | 7/1993 | Koss | 364/419.01 |
| 5,252,812 | 10/1993 | Nakamira | 235/380 |
| 5,339,392 | 8/1994 | Risberg et al. | 395/161 |
| 5,345,551 | 9/1994 | Shelley et al. | 395/157 |
| 5,416,903 | 5/1995 | Malcolm | 395/155 |

FOREIGN PATENT DOCUMENTS 63-145551  6/1988  Japan .
028943  1/1990  Japan .

*Primary Examiner*—Wayne Amsbury
*Attorney, Agent, or Firm*—Greer, Burns & Crain, Ltd.

[57] ABSTRACT

The present invention is a method for accessing character files comprising the steps of opening simultaneously a plurality of character files; retrieving said each of the character files to read, write, replace and delete graphic pattern data of a character designated by a user; and closing simultaneously said plurality of character files.

12 Claims, 9 Drawing Sheets

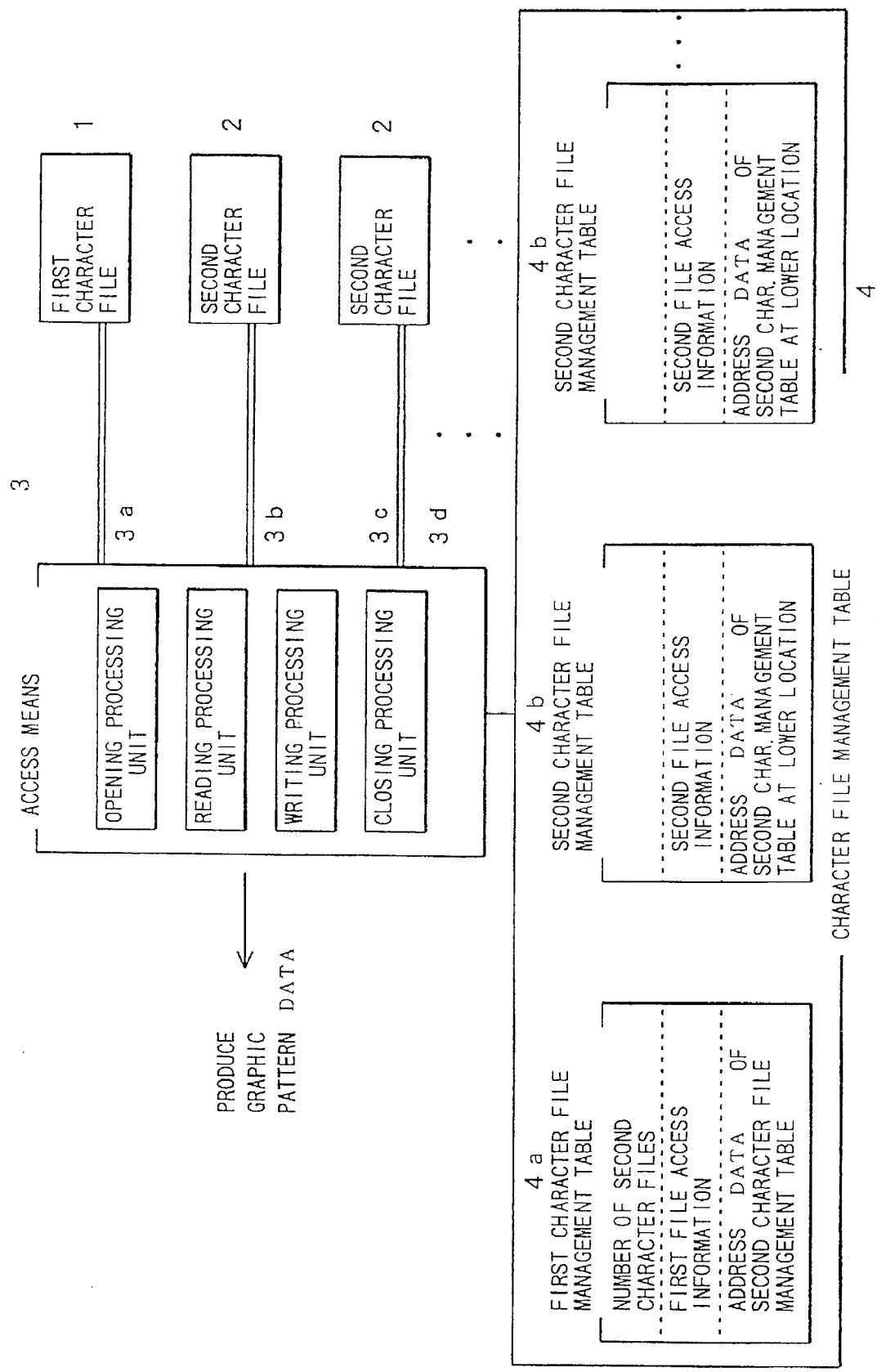
F I G. 1

EXTERNAL STORAGE DEVICE

MAIN CHARACTER FILE
FILE NAME: MOJI

| CHARACTER CODE | GRAPHIC DATA |
|---|---|
| CHARACTER CODE | GRAPHIC DATA |
| . . . . . | . . . . . |

8 a

SUB CHARACTER FILE A
FILE NAME: MOJI-A

| CHARACTER CODE | GRAPHIC DATA |
|---|---|
| CHARACTER CODE | GRAPHIC DATA |
| . . . . . | . . . . . |

8 b

SUB CHARACTER FILE B
FILE NAME: MOJI-B

| CHARACTER CODE | GRAPHIC DATA |
|---|---|
| CHARACTER CODE | GRAPHIC DATA |
| . . . . . | . . . . . |

METHOD AND DEVICE FOR ACCESSING CHARACTER FILES IMAGE DATA

This application is a continuation of application Ser. No. 08/108,106 filed on Aug. 17, 1993, now abandoned.

BACKGROUND OF THE INVENTION (1) Field of the Invention

The present invention relates to the method and the device for acessing character files.

(2) Description of the Related Art

A workstation or the like generally has main character files and sub character files.

The above mentioned main character file stores pattern data representing characters, symbols or configurations of graphic patterns similar to characters of one particular design. In addition, the main character file stores as a pair the pattern data and a character code specifying the pattern data. The main character file is preset in an application software or the like. The main character file stores, for example, pattern data for the characters represented in Gothic.

On the other hand, the sub character file stores pattern data representing characters or configurations of graphic patterns designed by a user. In other words, the sub character file is a file for storing during operation of the workstation the pattern data representing characters or configurations of graphic patterns designed by a user. The sub character file stores, as in the case of the main character file, the pattern data and a character code as a pair.

A user creates a program or types a text using said main and sub character files.

The above mentioned workstation comprises a memory for storing in parallel the main character files and the sub character files; an access function program for an access to each character file; and a processing unit for calling the access function program to access the main character file or the sub character file.

The above mentioned memory includes ROM (read only memory) for storing the main character files and RAM (random access memory) for storing the sub character files.

The above mentioned access function program includes an opening function program, a reading function program, a writing function program, a replace function program, a delete function program and a closing function program.

The opening function program is a program representing functionally procedures for opening either one of the main character files and the sub character files.

The reading function program is a program representing functionally procedures for reading the pattern data designated by a user out of the main character file or the sub character file.

The writing function program is a program representing functionally procedures for registering pattern data that a user newly designed in the sub character file.

The replace function program is a program representing functionally procedures for rewriting the pattern data designated by a user among the pattern data in the sub character file with the pattern data that a user newly designed.

The delete function program is a program representing functionally procedures for deleting the pattern data designated by a user from the pattern data in the sub character file.

The closing function program is a program representing functionally procedures for closing the main character file or a second character file in the open state.

For reading out pattern data registered in the main character file, a user enters the work station the file name of the main character file, path data of the main character file and a character code for said pattern data.

The processing unit of the workstation loads the opening function program.

The processing unit operates according to the opening function program to open the main character file on the basis of the file name and the path data.

Next, the processing unit loads the reading function program.

The processing unit operates according to the reading function program to access the main character file on the basis of said path data. Then, the processing unit retrieves the main character file to determine whether the pattern data corresponding to said character code is stored.

If said pattern data is stored, the processing unit reads said pattern data out of the main character file. This pattern data is transferred to a display device where it is displayed on a screen.

On the other hand, if said pattern data is not registered in the main character file, the processing unit supplies to the display device a message indicating that said pattern data is not registered.

On completion of reading said pattern data, the processing unit loads the closing function program.

The processing unit operates according to the closing function program to close the main character file on the basis of the file name and the path data of the main character file.

Next, for reading out the character(s) registered in the sub character file, a user enters the workstation character code data of the character(s) to be used, a file name of the sub character file and path data of the sub character file.

The processing unit of the workstation loads the opening function program. The processing unit operates according to the opening function to open the sub character file on the basis of said file name and the path data.

Next, the processing unit loads the reading function program. The processing unit operates according to the reading function program to access the sub character file on the basis of said path data. Then, the processing unit retrieves the sub character file to determine whether the pattern data corresponding to said character code is stored.

If said pattern data is stored, the processing unit reads said pattern data out of the sub character file. This pattern data is transferred to the display device where it is displayed on the screen.

On the other hand, if said pattern data is not registered in the sub character file, the processing unit supplies to the display device a message indicating that said pattern data is not registered.

On completion of reading out said pattern data, the processing unit loads the closing function program.

The processing unit operates according to the closing function program to close the sub character file on the basis of the file name and the path data of the sub character file.

Next, for using simultaneously a first character stored in the main character file and a second character stored in the sub character file, a user enters the work station a character code for the first character, the file name of the main character file, and the path data of the main character file, as well as entering a character code for the second character, the file name of the sub character file, and the path data of the sub character file.

The processing unit of the workstation first carries out an opening processing for the main character file, a readout processing for the pattern data of the first character and a closing processing for the main character file.

Next, the processing unit carries out an opening processing for the sub character file, a readout processing for the pattern data of the second character and a closing processing for the sub character file.

As mentioned above, conventional function programs are directed to process a single character file, so that it is necessary to initiate twice each of the opening function program, reading function program and the closing function program for applying the main character files and the sub character files. In addition, if a plurality of sub character files are provided, the access function program must be initiated many times.

Thus, a user is required to manage an access processing to the main character file and an access processing to the sub character file, which impose on a user a severe burden while the software itself is complicated.

The present invention is directed to access character files effectively with a simple software structure.

SUMMARY OF THE INVENTION

A method for accessing character files according to the present invention is an effective technique for a workstation of the like having first character files for storing character code data for independently specifying characters and graphic patterns similar to characters represented by one particular design, graphic pattern data representing the configuration of each character and graphic pattern data representing the configuration of each graphic pattern; and second character files for storing character code data for independently specifying characters and graphic patterns designed by a user and graphic pattern data representing the configuration of each character or each graphic pattern.

The second character file according to the present invention has a file name determined uniformly according to the file name of the first character file.

A method for accessing character files according to the present invention comprises the following steps:

(1) a step for simultaneously opening the first and the second character files;

(2) a step for accessing graphic pattern data of the first or the second character file to read, write, replace or delete the graphic pattern; and (3) a step for simultaneously closing the first and the second character files.

The above mentioned step (1) is executed when a user enters the file name of the first character file, storing position data of the first character file and storing position data of the second character file. More particularly, the above mentioned step (1) is carried out through the following procedures:

(a) a procedure for determining a file name of the second character file according to the file name of the first character file;

(b) a procedure for opening the first character file on the basis of the file name and the storing position data of the first character file;

(c) a procedure for opening the second character file on the basis of the file name and the storing position data of the second character file; and (d) a procedure for creating a character management table for use in managing the first and the second character files.

The above mentioned step (d) is described more in detail.

The step (d) is carried out through the following procedures:

(d1) a procedure for generating first character file access information for use in accessing the first character file;

(d2) a procedure for generating second character file access information for use in accessing the second character file;

(d3) a procedure for creating a second character file management table for storing the second character file access information; and (d4) a procedure for creating a first character file management table for storing said first character file access information, the number of second character files being opened, and the address data of the second character file management table.

In this event, the above mentioned step (3) includes a step for reading first access information and second access information out of said first character file management table and the second character file management table, respectively, to access the first or the second character file on the basis of the respective access information.

According to the present invention, opening or closing of the first character file is made with the simultaneous opening or closing, respectively, of the second character file. In other words, only one initiation of the opening function allows a user to open both the first and the second character files when the user wants to use the first and the second character files.

BRIEF DESCRIPTION OF THE DRAWING

FIG. 1 is a functional based block diagram of a device for accessing character files according to an embodiment 1;

FIG. 3 shows a practical example of an external storage device in an embodiment 2;

DETAILED DESCRIPTION OF THE PREFERRED EMBODIMENTS

Figure 2:
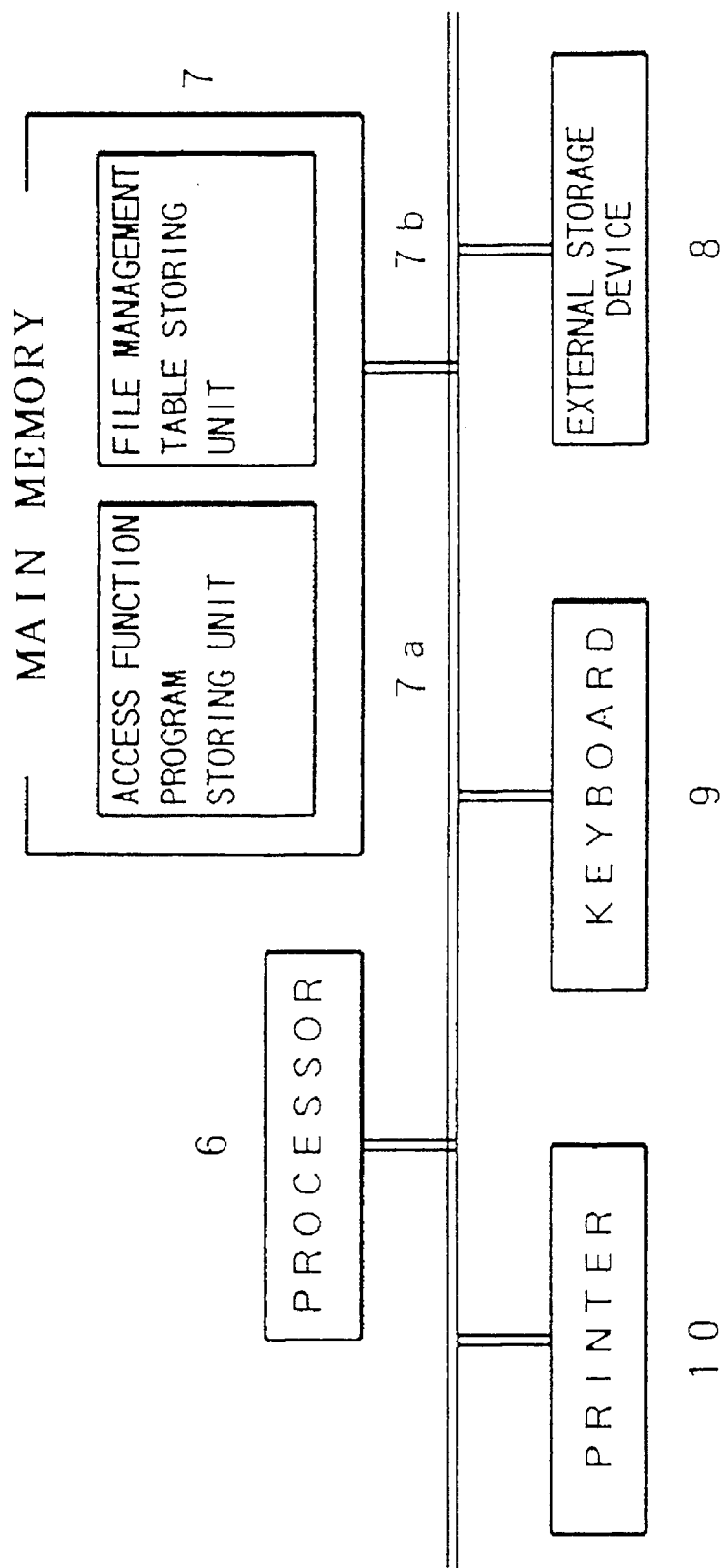
FIG. 2 is a device structural diagram for realizing a method for accessing character files.

Preferred embodiments of the present invention will be described below.

<EMBODIMENT 1>

The present embodiment 1 describes a device for use in realizing a method for accessing character files according to the present invention.

FIG. 1 shows a functional block diagram of a device for accessing character files. The device for accessing character files comprises first character file 1 for storing graphic pattern data representing configurations of characters or graphic patterns similar to characters of one particular design and second character files 2 for storing graphic pattern data representing configurations of characters or graphic patterns designed by a user.

The above mentioned first character file 1 for read-out only storing character code data for independently specifying a character or a graphic pattern of one particular design and graphic pattern data corresponding to each character code data.

The second character files 2 are files capable of being read and written that store character code data for independently specifying a character or a graphic pattern designed by a user and graphic pattern data corresponding to each character code data.

In this event, a file name of the second character file 2 is determined uniformly according to a file name of the first character file 1. For example, the file name of the second character file 2 is identical to the file name of the first character file 1 to apply an extender to this file name.

The device for accessing character files according to the present embodiment 1 comprises an access unit 3 having functions to simultaneously open the first character files 1 and the second character files 2, to retrieve the first character files 1 or the second character files 2 to read, write, replace and delete the graphic pattern data, and to simultaneously close the first and the second character files 1 and 2.

Functions of the access unit 3 is described in detail below.

The access unit 3 comprises an opening processing unit 3a, a reading processing unit 3b, a writing processing unit 3c and a closing processing unit 3d.

The opening processing unit 3a has a function to open the first and the second character files 1 and 2 simultaneously. More particularly, the opening processing unit 3a opens the first character files 1 on the basis of the file name and the storing position data of the first character file 1 when a user enters the file name of the first character file 1, the storing position data of the first character file 1 and the storing position data of the second character file 2. Simultaneously, the opening processing unit 3a determines the file name of the second character file 2 according to the file name of the first character file 1 to open the second character file 2 on the basis of this file name and the storing position data.

On opening the first character file 1, the opening processing unit 3a generates first access information for use in accessing the first character files 1. Next, the opening processing unit 3a generates, on opening the second character file 2, second access information for every second character file 2 being opened for use in accessing the second character files 2. The opening processing unit 3a creates a second character file management table 4b for storing the second access information. In this event, on opening a plurality of second character files 2, the opening processing unit 3a stores the second access information and address data of (n+1)-th second character file management table 4b in n-th second character file management table 4b. The opening processing unit 3a creates a first character file management table 4b for storing first access information and address data of the second file management table which is stored at the highest address (The starting address is higher than the ending address).

The reading processing unit 3b reads the first access information and the address data of the second character file management table 4b out of the first character file management table 4a when a user enters a character code data. It accesses the second character file management table 4b on the basis of said address data to read the second access information. Subsequently, the reading processing unit 3b retrieves the first and the second character files 1 and 2 on the basis of the first and the second access information to detect the storing position of the graphic pattern data corresponding to said character code data. The reading processing unit 3b reads the graphic pattern data at said storing position.

When n second character files 2 are opened, the reading processing unit 3b reads the second access information and the address data of the second character file management table 4b which is stored at the second address out of the second character file management table which is stored at the highest address. Then, the reading processing unit 3b accesses the second character file management table 4b which is stored at the second address on the basis of said address data to read the second access information. The reading processing unit 3b repeats the above mentioned processing until an access to the n-th second character file management table 4b.

The writing processing unit 3c reads the address data of the second character file management table 4b out of the first character file management table 4a when a user enters a character code data and graphic pattern data. The writing processing unit 3c accesses the second character file management table 4b on the basis of said address data to read the second access information. The writing processing unit 3c accesses the second character file 2 on the basis of the second access information to detect a free area available for storing said character code data and the graphic pattern data. The writing processing unit 3c writes said character code data and the graphic pattern data as a pair into said free area.

The writing processing unit 3c accesses the second character file in the manner similar to the above when a user enters a character code data to detect the storing position for the graphic pattern data corresponding to said character code data. Then, the writing processing unit 3c has a function to replace or delete the graphic pattern data at said storing position.

The closing processing unit 3d reads said first character file access information and the address data of the second character file management table 4b out of the first character file management table 4a. Then, the closing processing unit 3d closes the first character file 1 on the basis of said first access information and closes simultaneously the second character file(s) 2 on the basis of the second access information. In this event, if a plurality of second character files 2 are being opened, the closing processing unit 3d closes all second character files 2 simultaneously.

<EMBODIMENT 2>

FIG. 2 shows a device structure applicable to realize a method for accessing character files according to the present invention.

This figure shows a device structure when the present invention is applied to a workstation.

In the device, connected through a system bus are a processor 6, a main memory storage 7, an external storage device 8, a keyboard 9 and a printer 10.

The external storage device 8 stores one main character file 8a and two sub character files 8b and 8c.

A practical example of the external storage device 8 is shown in FIG. 3.

The external storage device 8 stores the main character file 8a and the sub character file (A) 8b and the sub character file (B) 8c.

The main character file 8a stores graphic pattern data of characters of one particular design and character code data for specifying the graphic pattern data. The main character file 8a allows only reading out the graphic pattern data.

The sub character file (A) 8b and the sub character file (B) 8c store graphic pattern data of characters designed by a user and character code data for specifying the graphic pattern data.

A file name of the main character file 8a is determined as "MOJI". A file name of the sub character file (A) 8b is "MOJI-A" obtained by adding an extender "A" to the file name of the main character file 8a while a file name of the sub character file (B) 8c is "MOJI-B" obtained by adding an extender "B" to the file name of the main character file 8a.

The main memory 7 comprises an access function program storing unit 7a and a file management table storing unit 7b.

Figure 4:
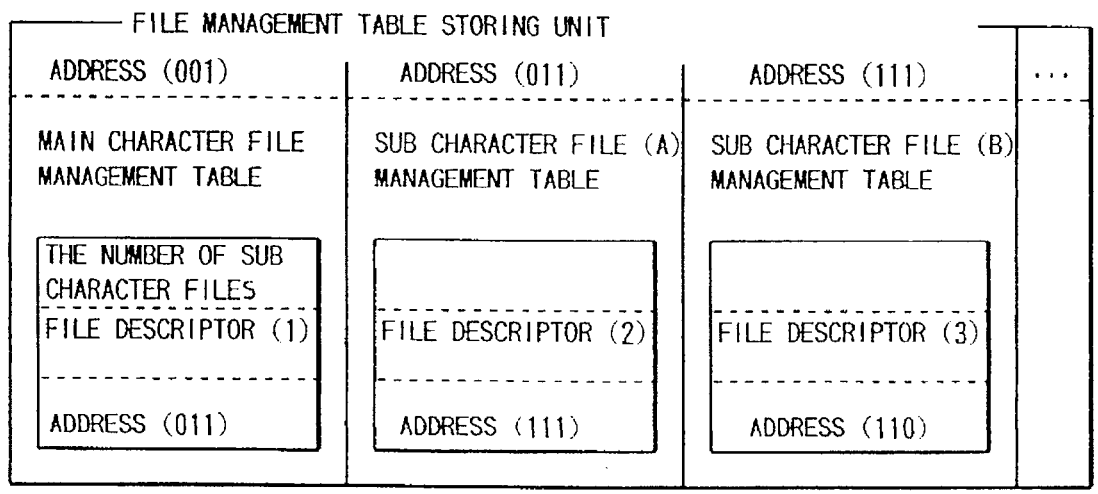
FIG. 4 shows a practical example of a file management table in the embodiment 2.

A practical example of the file management table is shown in FIG. 4.

The file management table storing unit 7b stores a main character file management table 74, a sub character file (A) management table 75 and a sub character file (B) management table 76 in the order of the higher address. (The starting address is higher than ending address.) For opening three or more sub character files, the sub character file management tables (75,76) are created for the respective sub character files (8b,8c) being opened. In other words, if n sub character files are opened, n sub character file management tables are created.

The main character file management table 74 stores the number of sub character files being opened, file descriptors of the main character file 8a and address data of the sub character file (A) management table 75.

The sub character file (A) management table 75 stores file descriptors of the sub character file (A) 8b and address data of the sub character file (B) management table 76 stored at the lower address.

The sub character file (B) management table 76 stores file descriptors of the sub character file (B) 8c and address data of the sub character file management table stored at the lower address. In this event, an address data storing area of the sub character file (B) management table 76 is assumed to be a free area.

The device for accessing character files is directed to create the sub character file management tables (75,76) in the order of entering path data when a plurality of sub character files (8b,8c) are opened. For example, if a user enters path data of the sub character file (A) 8b and subsequently enters path data of the sub character file (B) 8c, the sub character file (A) management table 75 is created, as shown in FIG. 4, at the lower location than where the main character file management table 74 is. In addition, the file (B) management table 76 is created at the lower address where the sub character file (A) management table 75 is.

Figure 5:
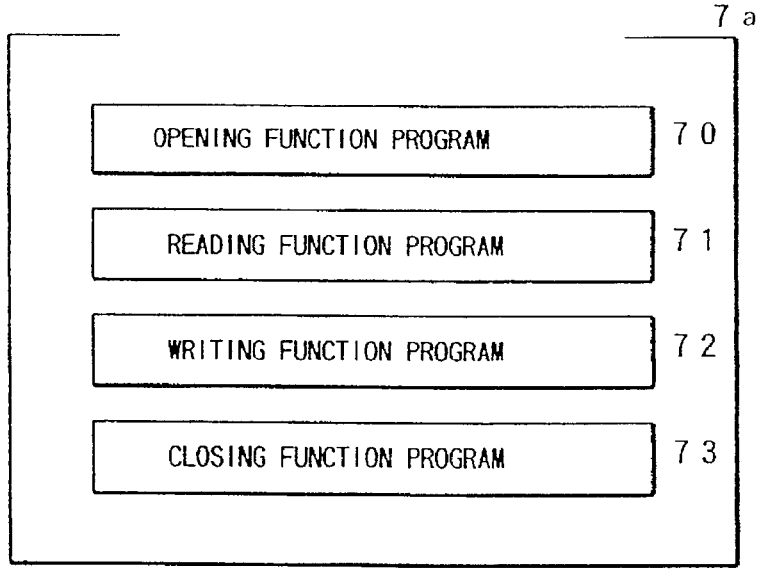
FIG. 5 shows a practical example of an access function program storing unit according to the embodiment 2.

FIG. 5 shows a practical example of the access function program storing unit 7a.

The access function program storing unit 7a stores an opening function program 70, a reading function program 71, a writing function program 72 and a closing function program 73.

The opening function program 70 is a program representing procedures for opening the character files. More particularly, it includes a step for opening the main character file 8a, the sub character file (A) 8b and the sub character file (B) 8c; and a step for creating the file management tables.

Practical procedures through which the opening function program 70 proceeds are described below:

(1) open the main character file 8a on the basis of the file name and the path data of the main character file 8a;

(2) determine a file descriptor for the main character file 8a; and (3) determine whether the path data of the sub character file includes the path data designated to be written.

In this event, if the path data designated to be written is included, (4) obtain the file name of the sub character file (A) 8b according to the file name of the main character file 8a;

(5) open the sub character file (A) 8b on the basis of the file name and the path data of the sub character file (A) 8b;

(5) determine a file descriptor for said sub character file (A) 8b;

(6) extract the path data most previously entered from the path data other than the written-designated path data, and simultaneously obtain the file name of the sub character file (B) 8c according to the main character file 8a;

(7) open the sub character file (B) 8c on the basis of the file name and the path data of the sub character file (B) 8b;

(8) determine a file descriptor for said sub character file (B) 8c;

(9) reserve an area for the file management table storing unit 7b on the main memory 7; and

(10) create the file management tables for the respective character files being opened.

On the other hand, at the above mentioned (3), if the path data entered includes no written-designated path data, the opening function program includes the following procedures:

(11) obtain the file name of the sub character file (A) 8b according to the main character file 8a to open the sub character file (A) 8b on the basis of this file name and the path data most previously entered;

(12) determine a file descriptor for the sub character file (A) 8b;

(13) open the sub character file (B) 8c on the basis of the path data entered just after the path data of the sub character file (A) 8b and the file name of the sub character file (B) 8c;

(14) determine a file descriptor for the sub character file (B) 8c;

(15) reserve an area for the file management table storing unit 7b; and

(16) create the file management tables for the respective character files being opened.

The reading function program 71 is a program representing procedures for reading the graphic pattern data out of either one of the character files, i.e., the main character file 8a, the sub character file (A) 8b and the sub character file (B) 8c. Procedures through which the reading function program 71 proceeds are described below:

(1) recognize a character code data for the graphic pattern data to be read;

(2) read the address data of the sub character file (A) management table 75 out of the main character file management table 74;

(3) read the file descriptor of the sub character file (A) 8b out of the sub character file (A) management table 75;

(4) access the sub character file (A) 8b on the basis of the file descriptor; and (5) retrieve the sub character file (A) 8b to detect the storing position of the graphic pattern data corresponding to the character code data.

In this event, if said graphic pattern data is stored in the sub character file (A) 8b, (6) read the graphic pattern data of said storing position data.

On the other hand, if unregistered in the sub character file (A) 8b in the above mentioned (5), (7) read the address data of the sub character file (B) management table 76 out of the sub character file (A) management table 75;

(8) read the file descriptor of the sub character file (B) 8c out of the sub character file (B) management table 76;

(9) access the sub character file (B) 8c on the basis of said file descriptor; and

(10) retrieve the sub character file (B) 8c to detect the storing position of the graphic pattern data corresponding to said character code data.

In this event, if said graphic pattern data is stored in the sub character file (B) 8c,

(11) read the graphic pattern data of said storing position data.

On the other hand, if said graphic pattern data is not registered in the sub character file (B) 8c in the above mentioned (10),

(12) read the file descriptor of the main character file 8a out of the main character file management table 74;

(13) access the main character file 8a on the basis of the file descriptor; and

(14) retrieve the main character file 8a to detect the storing position of the graphic pattern data corresponding to said character code data.

In this event, if said graphic pattern data is stored in the main character file 8a,

(15) read said graphic pattern data out of the main character file 8a.

On the other hand, if said graphic pattern data is not registered in the main character file 8a in the above mentioned (14), a message is produced indicating that said graphic pattern data is not registered.

It is noted that the sub character file (B) 8c and the sub character file (A) 8a may be accessed in any order.

Next, the writing function program 72 is a program representing procedures for writing graphic pattern data relating to a character designed by a user in either one of the sub character file (A) 8b and the sub character file (B) 8c. Procedures through which the writing function program proceeds are described below:

(1) recognize the graphic pattern data to be written and the character code data specifying this graphic pattern data;

(2) read the address of the sub character file (A) management table 75 (or the sub character file (B) management table 76) out of the main character file management table 74;

(3) read the file descriptor of the sub character file (A) 8b (or the sub character file (B) 8c) out of the sub character file (A) management table 75 (or the sub character file (B) management table 76);

(4) access the sub character file (A) 8b (or the sub character file (B) 8c) on the basis of said file descriptor; and (5) determine whether the character code data in question is registered in the sub character file (A) 8b.

In this event, if the character code data in question is not registered, (6) write the character code data in question and the graphic pattern data into the sub character file (A) 8b.

On the other hand, if the character code data in question is registered in the above mentioned (5), (7) replace the graphic pattern data already been registered by the graphic pattern data in question.

Next, the closing function program 73 is a program representing procedures for simultaneously closing the character files being open.

Procedures through which the closing function program 73 proceeds are described below:

(1) read the file descriptors out of all character file management tables;

(2) close the sub character file (A) 8b on the basis of the file descriptor of the sub character file (A) 8b;

(3) close the sub character file (B) 8c on the basis of the file descriptor of the sub character file (B) 8c;

(4) close the main character file on the basis of the file descriptor of the main character file 8a; and (5) release the area of the file management table storing unit 7b.

Concerning the sub character file (A) 8b and the sub character file (B) 8c, either one of the sub character files may be closed first.

The processor 6 has functions to open simultaneously files in the external storage device 8, to retrieve each file to read, write and replace the graphic pattern data, and to close simultaneously files.

In addition, the processor 6 has a function to create the character file management table for the respective character files being opened. It is noted that the processor 6 creates, on creating the file management table for the sub character file designated to be written, the sub character file management table at the lower location than where the main character file management table 74 is. This means that the sub character file management table for the sub character file designated to be written is created at an area of the sub character file (A) management table 75 shown in FIG. 5.

Characteristic mechanisms of the device for accessing character files are described below.

Figure 6:
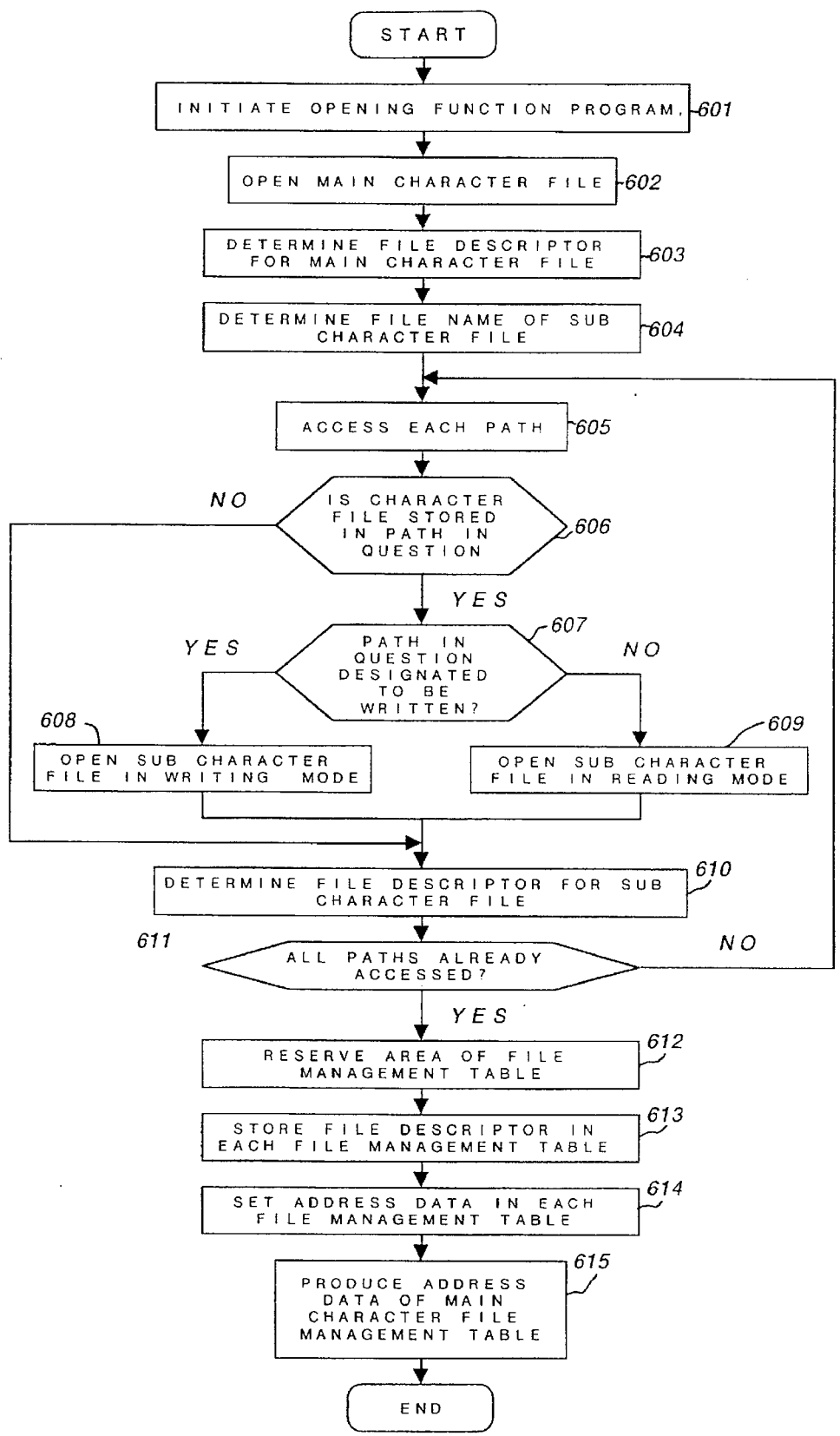
FIG. 6 is a flow chart showing operational process carried out by a processor on opening a file.

FIG. 6 shows an operational flow carried out by the processor 6 on opening files.

A user enters, through the keyboard 9, a file opening command, the file name "MOJI" of the main character file 8a, the path data of the main character file, and the path data of the sub character file(s) to be opened (the path data of both if the sub character file (A) 8b and the sub character file (B) 8c should be opened). In this event, the user indicates to write the path data of the sub character file subjected if he/she wants to write or replace the graphic pattern data.

The processor 6 initiates the opening function program 70 in response to recognition of said opening command (Step 601).

The subsequent processing is made according to the opening function program 70.

The processor 6 opens the main character file 8a on the basis of the file name "MOJI" and the path data of the main character file 8a (Step 602). The processor 6 then determines a file descriptor for the main character file 8a (Step 603).

Next, the processor 6 determines the file name of the sub character file (A) 8b (or the sub character file (B) 8c) according to the file name of the main character file 8a (Step 604). The processor 6 accesses the sub character file (A) 8b (or the sub character file (B) 8c) on the basis of said file name and the path data (Step 605) to determine whether the sub character file (A) 8b (or the sub character file (B) 8c) is stored in the path in question (Step 606).

If the sub character file (A) 8b (or the sub character file (B) 8c) is present, the processor 6 determines whether said path is designated to be written (Step 607).

In this event, if said path data is designated to be written, the processor 6 opens said sub character file (A) 8b (or the sub character file (B) 8c) in a writing mode (Step 608).

On the other hand, at the above mentioned Step 607, if the path in question is not designated to be written, the processor 6 opens the sub character file (A) 8b in question (or the sub character file (B) 8c) in a reading mode (Step 609).

Next, the processor 6 determines the file descriptor for the sub character file (A) 8b in question (or the sub character file (B) 8c) (Step 610).

On completion of access to all path data entered by a user, the processor 6 reserves on the main memory 7 areas for the file management table corresponding to the number of the files being opened (Steps 611 and 612).

Subsequently, the processor 6 stores the file descriptor in each file management table (Step 613). And the processor 6 stores the address data of the file management table at the lower address (Step 614). In other words, the processor 6 stores the address of the file management table stored at the lower address into all file management tables other than the file management table at the lowest address.

In addition the processor 6 stores the number of sub character files opened only in the main character file management table 74.

After completion of the above mentioned processing, the processor 6 produces the address data of the main character file management table 74 (Step 615).

Figure 7:
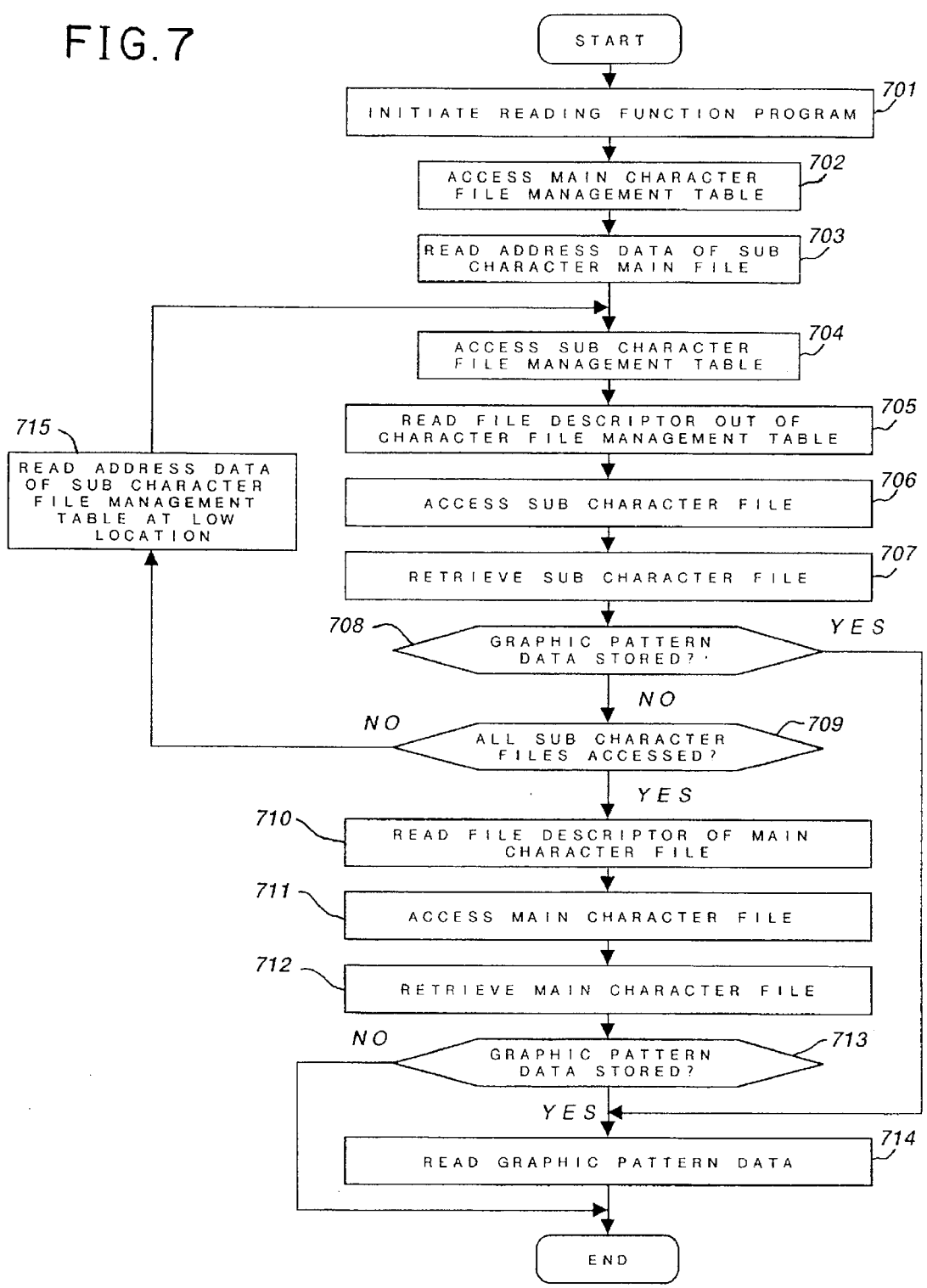
FIG. 7 is a flow chart showing operational process carried out by a processor on reading graphic pattern data.

Next, operational process carried out by the processor on reading the graphic pattern data is described with reference to the flow chart shown in FIG. 7.

When a user enters a character code of the graphic pattern data to be read, the processor 6 initiates the reading function program 71 (Step 701).

The processor 6 carries out subsequent processing according to the reading function program 71.

The processor 6 accesses the main character file management table 74 on the basis of the address data produced on opening processing (Step 702). The processor 6 reads the address data of the sub character file (A) management table 75 (or the sub character file (B) management table 76) out of the main character file management table 74 (Step 703).

The processor 6 accesses the sub character file (A) management table 75 (or the sub character file (B) management table 76) on the basis of said address data (Step 704). The processor 6 reads the file descriptor of the sub character file (A) 8b (or the sub character file (B) 8c) out of the sub character file (A) management table 75 (or the sub character file (B) management table 76) (Step 705).

The processor 6 accesses the sub character file (A) 8b (or the sub character file (B) 8c) on the basis of said file descriptor (Step 706). The processor 6 retrieves the sub character file (A) 8b (or the sub character file (B) 8c) on the basis of the character code entered by the user (Step 707) to determine whether the graphic pattern data corresponding to said character code is stored (Step 708).

In this event, if the graphic pattern data corresponding to the character code in question is stored in the sub character file (A) 8b (or the sub character file (B) 8c), this graphic pattern data is read out (Step 714).

On the other hand, if said graphic pattern data is not registered in the sub character file (A) 8b (or the sub character file (B) 8c), the processor 6 determines whether all sub character files opened are retrieved (Step 709). If there is any sub character file not being accessed, the processor 6 reads the address data of the sub character file management table set at the lower location out of the sub character file (A) management table 75 (or the sub character file (B) management table 76) to repeat the processing from Step 704.

When the processor 6 retrieves all sub character files, it reads the file descriptor of the main character file 8a out of the main character file management table 74 (Step 710).

The processor 6 accesses the main character file 8a on the basis of said file descriptor (Step 711). The processor 6 retrieves the main character file 8a to determine whether the graphic pattern data corresponding to said character code is stored (Steps 712 and 713).

In this event, if said graphic pattern data is not stored in the main character file 8a, the processor 6 produces a message indicating that said graphic pattern data is not registered.

On the contrary, if said graphic pattern data is stored in the main character file 8a, the processor 6 reads said graphic pattern data (Step 714).

Figure 8:
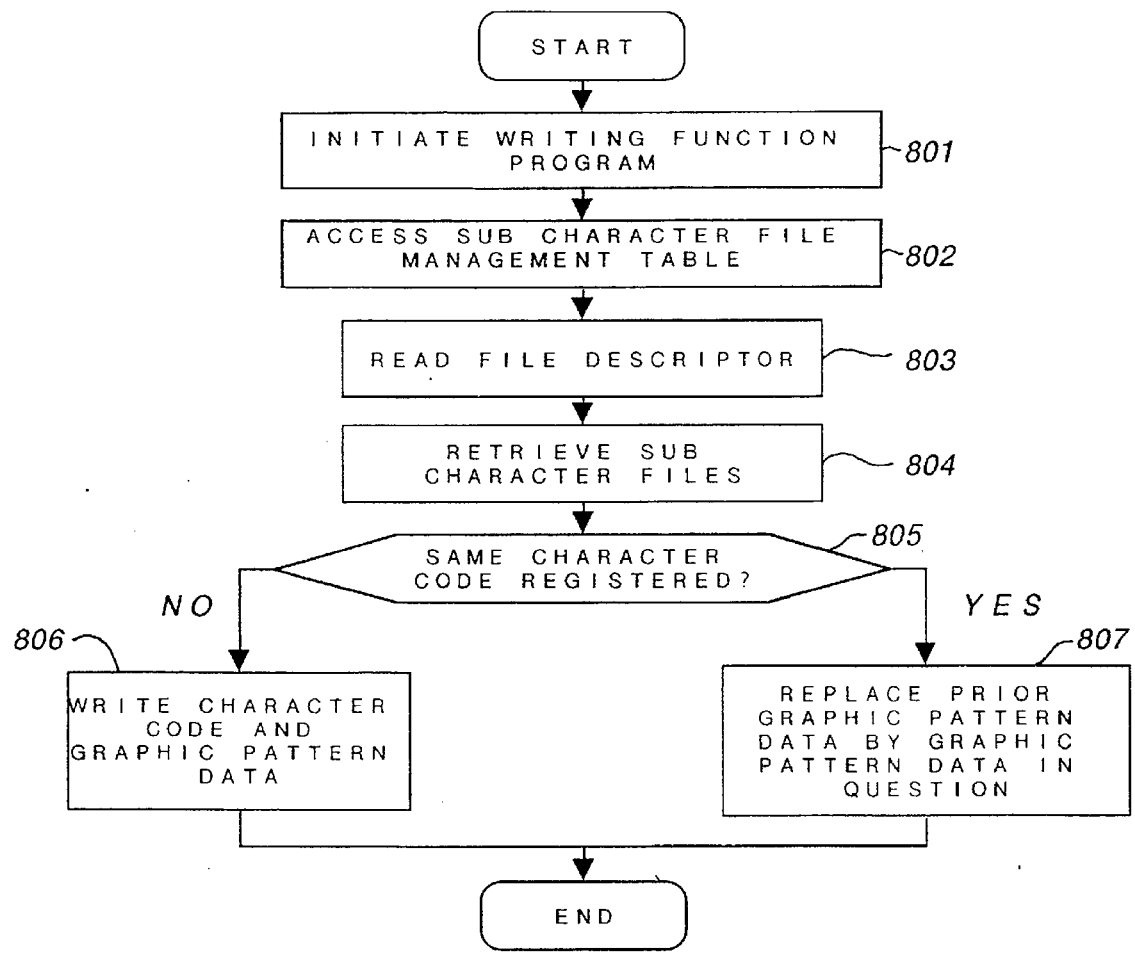
FIG. 8 is a flow chart showing operational process carried out by a processor on writing graphic pattern data.

An operational process carried out by the processor 6 for writing the graphic pattern data is described along the flow chart shown in FIG. 8.

A user opens, in the writing mode, the sub character file (A) 8b (or the sub character file (B) 8c) subjected to be written. When the character file is opened, the user enters the graphic pattern data and the character code specifying this graphic pattern data through the keyboard 9.

The processor 6 initiates the writing function program 72 in response to recognition of said graphic pattern data and the character code data (Step 801).

Subsequently, the processor 6 accesses the sub character file (A) management table 75 (or the sub character file (B) management table 76) of the sub character file (A) 8b (or the sub character file (B) 8c) designated to be written (Step 802).

The processor 6 reads the file descriptor out of the sub character file (A) management table 75 (or the sub character file (B) management table 76) (Step 803).

The processor 6 accesses the sub character file (A) 8b (or the sub character file (B) 8c) on the basis of said file descriptor. The processor 6 then retrieves the sub character file (A) 8b (or the sub character file (B) 8c) (Step 804) to determine whether there is the same character code as said character code (Step 805).

If there the same character code as the character code to be written in the sub character file in question, the processor 6 replaces the graphic pattern data already registered by the graphic pattern data generated by the user (Step 807).

On the contrary, if there is no character code same as the character code to be written in the sub character file in question, the processor 6 writes the graphic pattern data generated by the user and the character code (Step 806).

Figure 9:
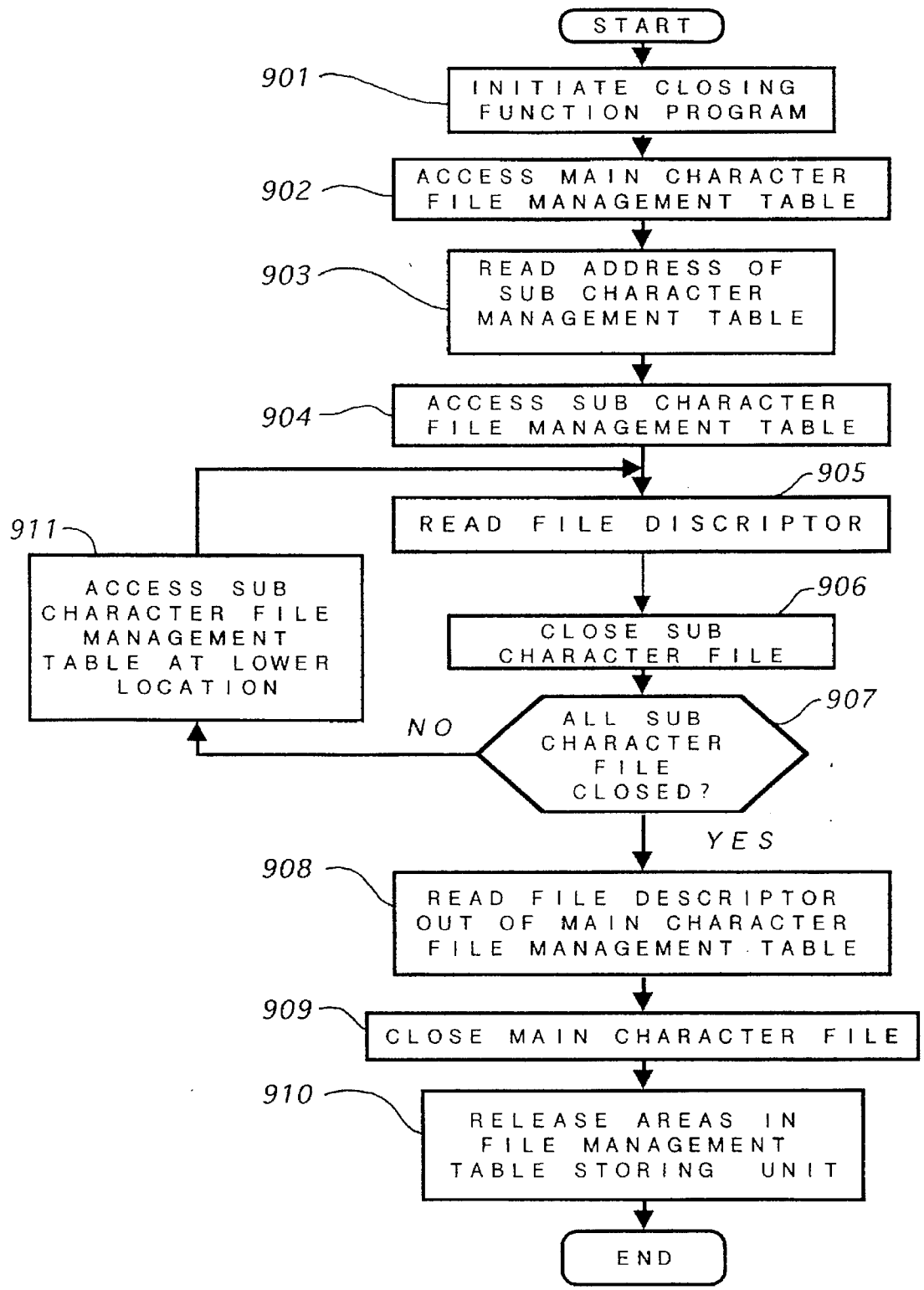
FIG. 9 is a flow chart showing operational process carried out by a processor on closing a file.
Figure 10:
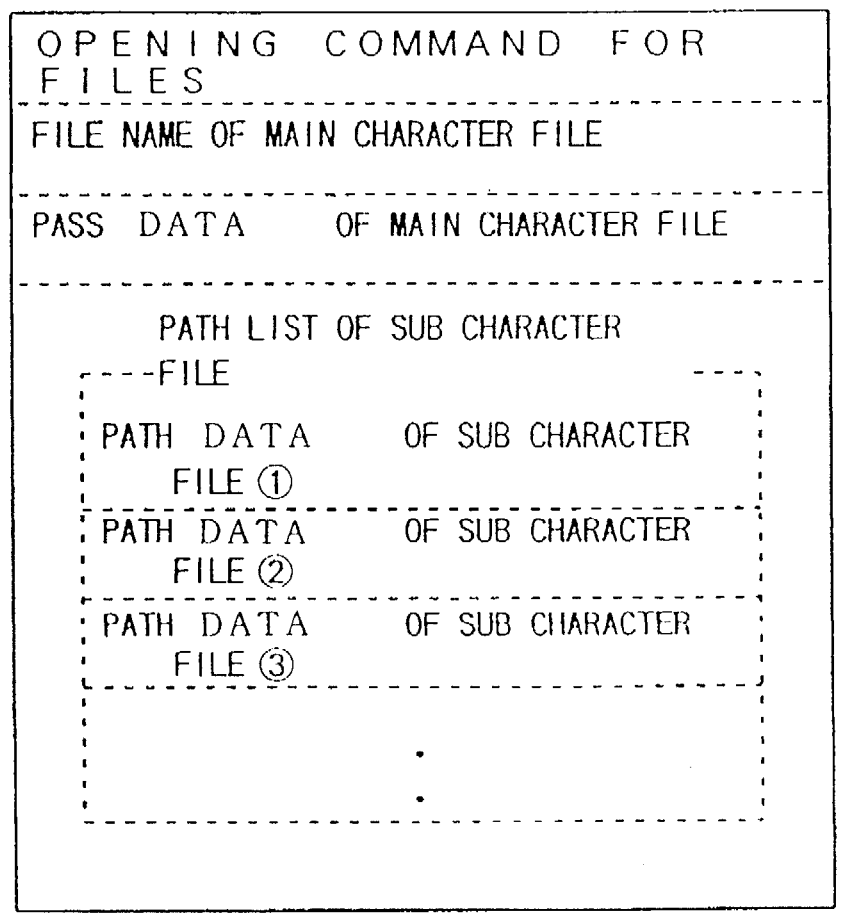
FIG. 10 shows a practical example of input information used on opening a file.

Next, shown in FIG. 9 is a flow chart of operation carried out by the processor 6 on closing each character file.

The processor 6 initiates the closing function program 73 when a user enters a closing command (Step 901).

The processor 6 carries out the subsequent processing along the closing function program 73.

The processor 6 accesses the main character file management table 74 (Step 902). The processor 6 reads the address data of the sub character file (A) management table 75 (or the sub character file (B) management table 76) out of the main character file management table 74 (Step 903).

The processor 6 accesses the sub character file (A) management table 75 (or the sub character file (B) management table 76) on the basis of said address data (Step 904). The processor 6 reads the file descriptor of the sub character file (A) 8b (or the sub character file (B) 8c) out of the sub character file (A) management table 75 (or the sub character file (B) management table 76) (Step 905).

The processor 6 closes the sub character file (A) 8b (or the sub character file (B) 8c) on the basis of said file descriptor (Step 906).

Subsequently, the processor 6 determines whether all sub character files are closed. In other words, the processor 6 determines whether the address data is stored in the sub character file (A) management table 75 (or the sub character file (B) management table 76) (Step 907).

In this event, if the address data is stored, the processor 6 accesses the sub character file (B) management table 76 (or the sub character file (A) management table 75) at the lower location on the basis of said address data (Step 911) to repeat the processing from the above mentioned Step 905.

If the address data is not stored, the processor 6 reads the file descriptor of the main character file 8a out of the main character file management table 74 (Step 908).

The processor 6 closes the main character file 8a on the basis of said file descriptor (Step 909).

The processor 6 releases the areas of the file management table storing unit (Step 910).

As mentioned above, according to the present invention, it is possible to open or close the main character file 8a and the sub character file (A) 8b (or the sub character file (B) 8c) simultaneously through one initiation for each of the opening function program 70, and the closing function program.

While the above mentioned embodiments have thus been described in conjunction with the case where the order to open the sub character file and the order to retrieve the graphic pattern data to be read advances in the same order as the path data entered by a user, to open or retrieve the file(s) may be made in any order.

In addition, the access function storing unit 7a may store a delete function program for deleting graphic pattern data.

In addition, while the present embodiment 2 has been described in conjunction with the graphic pattern data restricted as characters, it may be characters, symbols or any other graphic patterns similar to characters.

What is claimed is:

1. A method for accessing character files including a read-out only first character file for storing first character code data for independently specifying a character or a graphic of a particular design and first graphic pattern data representing the character or the graphic corresponding to each first character code data, and a read/write second character file for storing user defined second character code data for independently specifying a character or a graphic designed by a user and second graphic pattern data representing the user designed character or graphic corresponding to each user defined second character code data, comprising the steps of:

entering a first character file name of the first character file, storing position data of the first character file, and storing position data of the second character file;

determining a second character file name of said second character file on the basis of said first character file name;

opening the first character file on the basis of said first character file name and said storing position data of the first character file;

opening the second character file on the basis of said second character file name and said storing position data of the second character file at the same time of opening the first character file;

generating first character file access information for use in accessing the first character file, and second character file access information for use in accessing the second character file in order to create a second character file management table for storing said second character file access information and a first character file management table for storing said first character file access information, a number of second character files being opened, and address data of said second character file management table;

retrieving the first character file or the second character file to read the first or second graphic pattern data corresponding to the first or second character code data entered by the user;

wherein said step of retrieving, as applied to the second character file, further includes writing, replacing or deleting the second graphic pattern data corresponding to the second character code data entered by the user; and closing simultaneously the first character file and the second character file.

2. A method for accessing character files as claimed in claim 1 wherein said step of reading the first or second graphic pattern data comprises the steps of:

entering a predetermined first or second character code data;

accessing said first character file management table to read said first character file access information and said address data of said second character file management table out of said first character file management table;

accessing said second character file management table on the basis of said address data of said second character file management table to read said second character file access information out of said second character file management table;

accessing the first and second character files on the basis of said first character file access information and said second character file access information;

retrieving the first and second character files to detect a storing position of the first or second graphic pattern data corresponding to said predetermined first or second character code data; and reading the first or second graphic pattern data from said detected storing position.

3. A method for accessing character files as claimed in claim 1, wherein said step of writing the second graphic pattern data comprises the steps of:

entering a predetermined second character code data and a predetermined second graphic pattern data corresponding to said predetermined second character code data;

accessing said first character file management table to read said address data of said second character file management table out of said first character file management table;

accessing said second character file management table on the basis of said address data of said second character file management table to read said second character file access information out of said second character file management table; and accessing the second character file on the basis of said second character file access information in order to write said predetermined second character code data and said predetermined second graphic pattern data in a free area in the second character file.

4. A method for accessing character files as claimed in claim 1, wherein said step of replacing the second graphic pattern data comprises the steps of:

entering a predetermined second character code data and a predetermined second graphic pattern data corresponding to said predetermined second character code data;

accessing said first character file management table to read said address data of said second character file management table out of said first character file management table;

accessing said second character file management table on the basis of said address data of said second character file management table to read said second character file access information out of said second character file management table;

accessing the second character file on the basis of said second character file access information;

retrieving the second character file to detect a storing position of the second graphic pattern data corresponding to said predetermined second character code data; and replacing the second graphic pattern data at said detected storing position by said predetermined second graphic pattern data.

5. A method for accessing character files as claimed in claim 1, wherein said step of deleting the second graphic pattern data comprises the steps of:

entering a predetermined second character code data;

accessing said first character file management table to read said address data of said second character file management table out of said first character file management table;

accessing said second character file management table on the basis of said address data of said second character file management table to read said second character file access information out of said second character file management table;

accessing the second character file on the basis of said second character file access information;

retrieving the second character file to detect the storing position of the second graphic pattern data corresponding to said predetermined second character code data; and deleting the second graphic pattern data at said detected storing position.

6. A device for accessing character files comprising:

a read-out only first character file for storing first character code data for independently specifying a character or a graphic of a particular design and first graphic pattern data representing the character or the graphic corresponding to each first character code data;

a read/write second character file for storing a user defined second character code data for independently specifying a character or a graphic designed by the user and second graphic pattern data representing the user designed character or graphic corresponding to each user defined second character code data, said second character file having a file name determined uniformly according to a file name of said first character file;

entering means for entering a first character file name of said first character file, storing position data of said first character file, and storing position data of said second character file;

opening means for opening said first character file on the basis of said first character file name and said storing position data of said first character file, while simultaneously determining a second character file name of said second character file on the basis of the file name of said first character file to open said second character file on the basis of the second character file name and said storing position data of said second character file;

generating means for generating first character file access information for use in accessing said first character file and second character file access information for use in accessing said second character file in order to create a file management table including a second character file management table for storing said second character file access information and a first character file management table for storing said first character file access information, a number of second character files being opened, and address data of said second character file management table.

7. A device for accessing character files as claimed in claim 6, wherein said generating means create, when a plurality of said second character files are opened, said second character file management table for each of said respective second character files being opened.

8. A device for accessing character files as claimed in claim 7, wherein among said plurality of second character file management tables, a N-th second character file management table stores said second character file access information and address data of a (N+1)-th second character file management table.

9. A device for accessing character files as claimed as claim 6, further comprises, a reading-out processing means for accessing, when a predetermined first or second character code data is entered, said first character file or said second character file with reference to said first character file access information of said first character file management table or said second character file access information of said second character file management table to read-out said first or second graphic pattern data corresponding to said predetermined first or second character code data; and a writing processing means for accessing, when a predetermined user defined second character code data and a predetermined user defined second graphic pattern data are entered, said second character file with reference to said second character file access information of said second character file management table to write said predetermined user defined second character code data and said predetermined user defined second graphic pattern data into said second character file.

10. A device for accessing character files as claimed in claim 9, wherein said reading processing means access said first character file management table in response to recognition of address data of said first character file management table supplied from said generating means;

recognize said first character file access information and said address data of said second character file management table with said first character file management table;

access said second character file management table on the basis of said address data of said second character file management table and recognize said second character file access information; and access said first and second character files on the basis of said first character file access information and said second character file access information to read said first or second graphic pattern data corresponding to said predetermined first or second character code data entered by the user.

11. A device for accessing character files as claimed in claim 9, wherein said writing processing means access said first character file management table in response to recognition of address data of said first character file management table supplied from said generating means;

recognize said address data of said second character file management table with said first character file management table to access said second character file management table; and recognize said second character file access information with said second character file management table to access said second character file, thereby, writing said predetermined user defined second character code data and said predetermined user defined second graphic pattern data corresponding to said predetermined user defined second character code data entered by the user into said second character file.

12. A device for accessing character files as claimed in claim 6, further comprising closing means for recognizing said first character file access information with said first character file management table while simultaneously recognizing said second character file access information with said second character file management table, thereby accessing said first character file and said second character file to close both character files.

* * * * *

UNITED STATES PATENT AND TRADEMARK OFFICE
CERTIFICATE OF CORRECTION

PATENT NO. : 5,628,010
DATED : May 6, 1997
INVENTOR(S) : Ooishi et al.

It is certified that error appears in the above-indentified patent and that said Letters Patent is hereby corrected as shown below:

Column 1, line 10, delete "acessing" and insert --accessing--.

Column 1, line 18, after "pair" insert --,--.

Column 1, line 26, after "storing" insert --,--.

Column 1, line 26, after "workstation" insert --,--.

Column 1, line 35, after "storing" insert --,--; and after "parallel" insert --,--.

UNITED STATES PATENT AND TRADEMARK OFFICE
CERTIFICATE OF CORRECTION

PATENT NO. : 5,628,010
DATED : May 6, 1997
INVENTOR(S) : Ooishi et al.

It is certified that error appears in the above-indentified patent and that said Letters Patent is hereby corrected as shown below:

Column 1, lines 47-48, after "representing", insert --,--; and after "functionally" insert --,--.

Column 1, lines 50-51, after "representing" insert --,--; and after "functionally" insert --,--.

Column 1, lines 54-55, after "representing", insert --,--; and after "functionally" insert --,--.

Column 2, line 2, after "enters" insert --into--.

Column 2, lines 23-24, after "supplies" insert --a message--; and after "device" delete "a message".

UNITED STATES PATENT AND TRADEMARK OFFICE
CERTIFICATE OF CORRECTION

PATENT NO. : 5,628,010
DATED : May 6, 1997
INVENTOR(S) : Ooishi et al.

It is certified that error appears in the above-indentified patent and that said Letters Patent is hereby corrected as shown below:

Column 2, line 62, after "enters" insert --into--.

Column 3, line 11, delete "twice"; and after "of" insert --the following two times:--.

Column 3, line 12, delete "program," (first occurrence) and insert --program;--.

Column 3, line 19, delete "impose on a" insert --imposes--.

Column 3, line 19, delete "user"; and after "burden" insert --on the user,--.

Column 3, line 28, delete "of" and insert --or--.

UNITED STATES PATENT AND TRADEMARK OFFICE
CERTIFICATE OF CORRECTION

PATENT NO. : 5,628,010
DATED : May 6, 1997
INVENTOR(S) : Ooishi et al.

It is certified that error appears in the above-indentified patent and that said Letters Patent is hereby corrected as shown below:

Column 4, line 1, delete "is described more in" and insert --will now be described in more--.

Column 4, line 35, delete "an" and insert --a first--.

Column 4, line 35, delete "1;".

Column 4, line 39, delete "an embodiment 2" and insert --a second embodiment--.

Column 4, line 42, delete "embodiment 2" and insert --second embodiment--.

Column 4, line 44, delete "embodiment 2"; and insert --second embodiment--

Column 5, line 7, after "file 1" insert --is a file--.

UNITED STATES PATENT AND TRADEMARK OFFICE
CERTIFICATE OF CORRECTION

PATENT NO. : 5,628,010
DATED : May 6, 1997
INVENTOR(S) : Ooishi et al.

It is certified that error appears in the above-indentified patent and that said Letters Patent is hereby corrected as shown below:

Column 5, line 62, delete "The" and insert --the--.

Column 5, line 67, after "enters" delete "a".

Column 6, line 24, after "enters" delete "a".

Column 6, line 35, delete "the" (first occurrence) and insert --a--.

Column 6, line 35, delete "the above when a" and insert --that described above when the--.

Column 6, line 36, delete "a".

Column 6, line 41, delete "said" and insert --the--.

Column 6, line 45, delete "said" and insert --the--.

UNITED STATES PATENT AND TRADEMARK OFFICE
CERTIFICATE OF CORRECTION

PATENT NO. : 5,628,010
DATED : May 6, 1997
INVENTOR(S) : Ooishi et al.

It is certified that error appears in the above-indentified patent and that said Letters Patent is hereby corrected as shown below:

Column 10, line 24, delete "open simultaneously" and insert --simultaneously open--.

Column 11, line 33, delete "is" and insert --will be--.

Column 12, line 7, after "760" and insert --)-- (a close parenthesis).

Column 12, line 16, delete "said" and insert --the--.

Column 12, line 24, delete "is" and insert --will be--.

Column 12, line 24, after "along" insert --with--.

Column 12, line 52, after "code" insert --the--.

Signed and Sealed this

First Day of September, 1998

Attest:

BRUCE LEHMAN

*Attesting Officer*     Commissioner of Patents and Trademarks